US012217131B2

(12) United States Patent
Bonderson et al.

(10) Patent No.: US 12,217,131 B2
(45) Date of Patent: Feb. 4, 2025

(54) IDENTIFYING MINIMUM-ENERGY RESONANCE REGION AT MAJORANA ISLAND

(71) Applicant: Microsoft Technology Licensing, LLC, Redmond, WA (US)

(72) Inventors: Parsa Bonderson, Santa Barbara, CA (US); David Alexander Aasen, Santa Barbara, CA (US); Christina Paulsen Knapp, Goleta, CA (US); Roman Bela Bauer, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 18/335,624

(22) Filed: Jun. 15, 2023

(65) Prior Publication Data
US 2024/0419999 A1 Dec. 19, 2024

(51) Int. Cl.
*G06N 10/20* (2022.01)
*G06N 10/40* (2022.01)

(52) U.S. Cl.
CPC .............. *G06N 10/20* (2022.01); *G06N 10/40* (2022.01)

(58) Field of Classification Search
CPC ................................ G06N 10/20; G06N 10/40
See application file for complete search history.

(56) References Cited

U.S. PATENT DOCUMENTS

| 2017/0091649 A1* | 3/2017 | Clarke | G06N 10/00 |
| 2018/0053113 A1* | 2/2018 | Lutchyn | H10N 60/11 |
| 2022/0182027 A1* | 6/2022 | Reilly | H01L 29/122 |
| 2023/0204642 A1* | 6/2023 | Koski | G01R 31/2621 |
| | | | 324/762.09 |

\* cited by examiner

*Primary Examiner* — Sibin Chen
(74) *Attorney, Agent, or Firm* — Alleman Hall & Tuttle LLP

(57) ABSTRACT

A computing system including a quantum computing device. The quantum computing device includes a Majorana island, a quantum dot (QD), an electrical ground, and a capacitance sensor. The computing system further includes a controller configured to, in each of a plurality of sampling iterations, control the quantum computing device to electrically couple the Majorana island to the electrical ground, disconnect the Majorana island from the electrical ground, electrically couple the Majorana island to the QD, scan over values of a first plunger gate voltage applied to a first plunger gate and a second plunger gate voltage applied to a second plunger gate, and output quantum capacitance measurements. The controller is further configured to receive the quantum capacitance measurements and determine a measured distribution of resonance regions associated with the sampling iterations. The controller is further configured to identify a minimum-energy resonance region and output the minimum-energy resonance region identification.

20 Claims, 13 Drawing Sheets

IDENTIFYING MINIMUM-ENERGY RESONANCE REGION AT MAJORANA ISLAND

BACKGROUND

Majorana-based quantum computing is an approach to quantum computing that utilizes Majorana zero modes (MZMs). The MZMs are instantiated at floating superconducting regions of a quantum computing device. When two or more MZMs are formed at a floating superconducting region, that superconducting region is known as a Majorana island. The parities of the MZMs included in the Majorana island may be used to store qubits and classical bits that are used in quantum computations.

Majorana-based quantum computing devices may also include quantum dots (QDs) that are connectable to the MZMs. To perform quantum computations at the Majorana islands, MZMs may be connected to each other via the QDs to form measurement loops. At these measurement loops, the joint parities of the MZMs may be measured to apply joint parity measurement operators to the quantum state of the MZMs. Logic gates may be constructed from these joint parity measurements.

SUMMARY

According to one aspect of the present disclosure, a computing system is provided, including a quantum computing device. The quantum computing device includes a Majorana island at which a plurality of Majorana zero modes (MZMs) are instantiated. The quantum computing device further includes a quantum dot (QD) configured to be electrically connectable to the Majorana island via an MZM of the plurality of MZMs. The quantum computing device further includes an electrical ground and a capacitance sensor. The computing system further includes a controller configured to, in each of a plurality of sampling iterations, control the quantum computing device to electrically couple the Majorana island to the electrical ground while a first plunger gate located proximate to the Majorana island is set to an idle voltage. The controller is further configured to control the quantum computing device to disconnect the Majorana island from the electrical ground and electrically couple the Majorana island to the QD. Via the capacitance sensor, the controller is further configured to control the quantum computing device to scan over a plurality of values of a first plunger gate voltage applied to the first plunger gate and a second plunger gate voltage applied to a second plunger gate located proximate to the QD. The controller is further configured to control the quantum computing device to output, to the controller, respective quantum capacitance measurements obtained at the plurality of values of the first plunger gate voltage and the second plunger gate voltage. The controller is further configured to receive the quantum capacitance measurements. Based at least in part on the quantum capacitance measurements, the controller is further configured to determine a measured distribution of a respective plurality of resonance regions associated with the sampling iterations. Based at least in part on the measured distribution, the controller is further configured to identify a minimum-energy resonance region of the plurality of resonance regions that corresponds to a minimum energy value of the Majorana island. The controller is further configured to output the minimum-energy resonance region identification.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
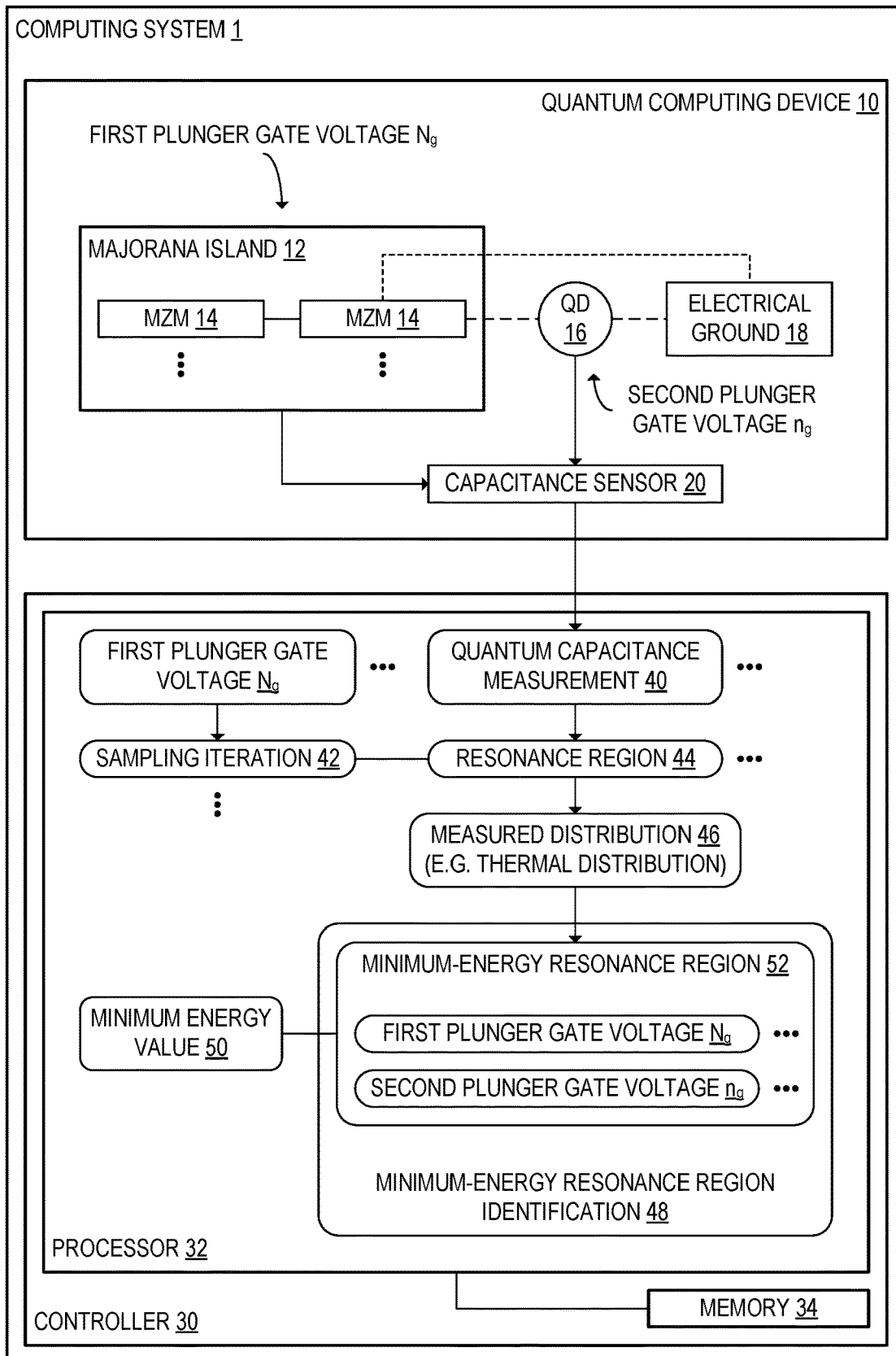
FIG. 1 schematically shows a computing system that includes a quantum computing device and a controller, where the quantum computing device includes a Majorana island and a quantum dot, according to one example embodiment.

During operation of a Majorana-based quantum computing device (also referred to as a topological quantum computing device), respective voltages are applied to the Majorana islands and the QDs. For example, a Majorana island plunger gate voltage and a QD plunger gate voltage may be applied with respective plunger gates located proximate to the Majorana island and the QD.

When a joint parity measurement is performed, the quantum capacitance of a QD is measured when the QD is electrically coupled to a pair of MZMs. These MZMs may be located at the same Majorana island or different Majorana islands. The joint parity measurement may also make use of one or more additional QDs included in the measurement loop.

The values of the Majorana island plunger gate voltage and the QD plunger gate voltage may affect the measurement visibility of joint parity measurements. When a joint parity measurement is performed, the measurement may output a positive parity value or a negative parity value. However, the joint parity measurement may instead have an ambiguous measurement outcome. An ambiguous measurement outcome may occur when the quantum capacitance values corresponding to positive and negative parity are too close to reliably distinguish. The difference between the quantum capacitance values measured at positive and negative parity may depend upon the values of the Majorana island plunger gate voltage and the QD plunger gate voltage. Accordingly, to reduce the probability of an ambiguous measurement, it is useful to obtain voltage values for which the positive and negative parity values are highly distinguishable.

A ground state of the Majorana island may change during device operation as a result of quasiparticle poisoning (QPP). Due to this change in the ground state, the values of the Majorana island plunger gate voltage and the QD plunger gate voltage that provide high measurement visibility may change, potentially resulting in low measurement visibility for joint parity measurements that are performed after a QPP event.

There are three types of QPP that occur at Majorana-based quantum computing devices: intrinsic QPP, extrinsic QPP, and inter-component QPP. Intrinsic QPP is QPP that occurs when the fermion number of a Majorana island remains constant, but the ground states of the Majorana island are thermally excited above the superconducting gap. Thus, a quasiparticle is expelled from an MZM and may be absorbed by another MZM. In extrinsic QPP, the Majorana island exchanges fermions with a fermion source or sink outside the system of Majorana islands and QDs that are used to instantiate qubits. Inter-component QPP occurs when a Majorana island exchanges a fermion with another Majorana island or with a QD. Extrinsic and inter-component QPP change the total fermion number of the Majorana island.

Using the devices and methods discussed below, the value of the fermion number of a Majorana island may be identified during device calibration and initialized to a baseline value when preparing the quantum computing device for execution of a quantum computation. The devices and methods discussed below may be used to identify a minimum-energy resonance region corresponding to a highest-probability value of the fermion number, with respect to a given idle configuration of the Majorana island. During device calibration, the total fermion number may be set to a known value such that a joint parity measurement may be calibrated at different values of the total fermion number.

FIG. 1 schematically shows a computing system 1 that includes a quantum computing device 10 and a controller 30. FIG. 1 shows, at the quantum computing device 10, a Majorana island 12 at which a plurality of Majorana zero modes (MZMs) 14 are instantiated. The MZMs 14 instantiated at the Majorana island 12 form in pairs at the ends of topological superconducting nanowires. The Majorana island 12 may be a coherent link that includes two MZMs 14, a Majorana tetron that includes four MZMs 14, or a Majorana hexon that includes six MZMs 14.

The quantum computing device 10 further includes a QD 16 configured to be electrically connectable to the Majorana island 12 via an MZM 14 of the plurality of MZMs 14 included in that Majorana island 12. The quantum computing device is configured to apply a first plunger gate voltage $N_g$ to the Majorana island 12 and apply a second plunger gate voltage $n_g$ to the QD 16.

The quantum computing device 10 further includes an electrical ground 18 that is electrically connectable to the Majorana island 12. The Majorana island 12 may accordingly be switchably grounded by electrically coupling the Majorana island 12 to the electrical ground 18. In some examples, the electrical ground 18 is directly coupled to the Majorana island 12, whereas in other examples, the electrical ground 18 is coupled to the Majorana island 12 via the QD 16. These two example paths between the Majorana island 12 and the electrical ground 18 are shown in FIG. 1.

The quantum computing device 10 further includes a capacitance sensor 20. Via the capacitance sensor 20, the quantum computing device 10 may be configured to collect quantum capacitance measurements 40 of a system that includes the Majorana island 12 and the QD 16. These quantum capacitance measurements 40 may be transmitted to the controller 30, which, as discussed in further detail below, is configured to use the quantum capacitance measurements 40 to identify resonance regions 44.

The controller 30, as shown in the example of FIG. 1, is a classical computing device that includes a processor 32 and memory 34. The processor 32 may be instantiated in a single processing device or may alternatively include a plurality of processing devices. The one or more processing devices included in the processor 32 may, for example, include one or more central processing units (CPUs), graphics processing units (GPUs), and/or other processing devices such as specialized hardware accelerators. The memory 34 may be instantiated as one or more memory devices, which may include one or more volatile and/or non-volatile memory devices. In some examples, the functionality of the controller 30 may be achieved by a plurality of networked physical computing devices, such as a plurality of networked compute nodes located in a data center.

As discussed above, the controller 30 may be configured to receive sensor data from the quantum computing device 10. The controller 30 may be further configured to generate instructions with which the components of the quantum computing device 10 are controlled. For example, instructions generated at the controller 30 may be used to set the first plunger gate voltage $N_g$ and the second plunger gate voltage $n_g$.

Figure 2:
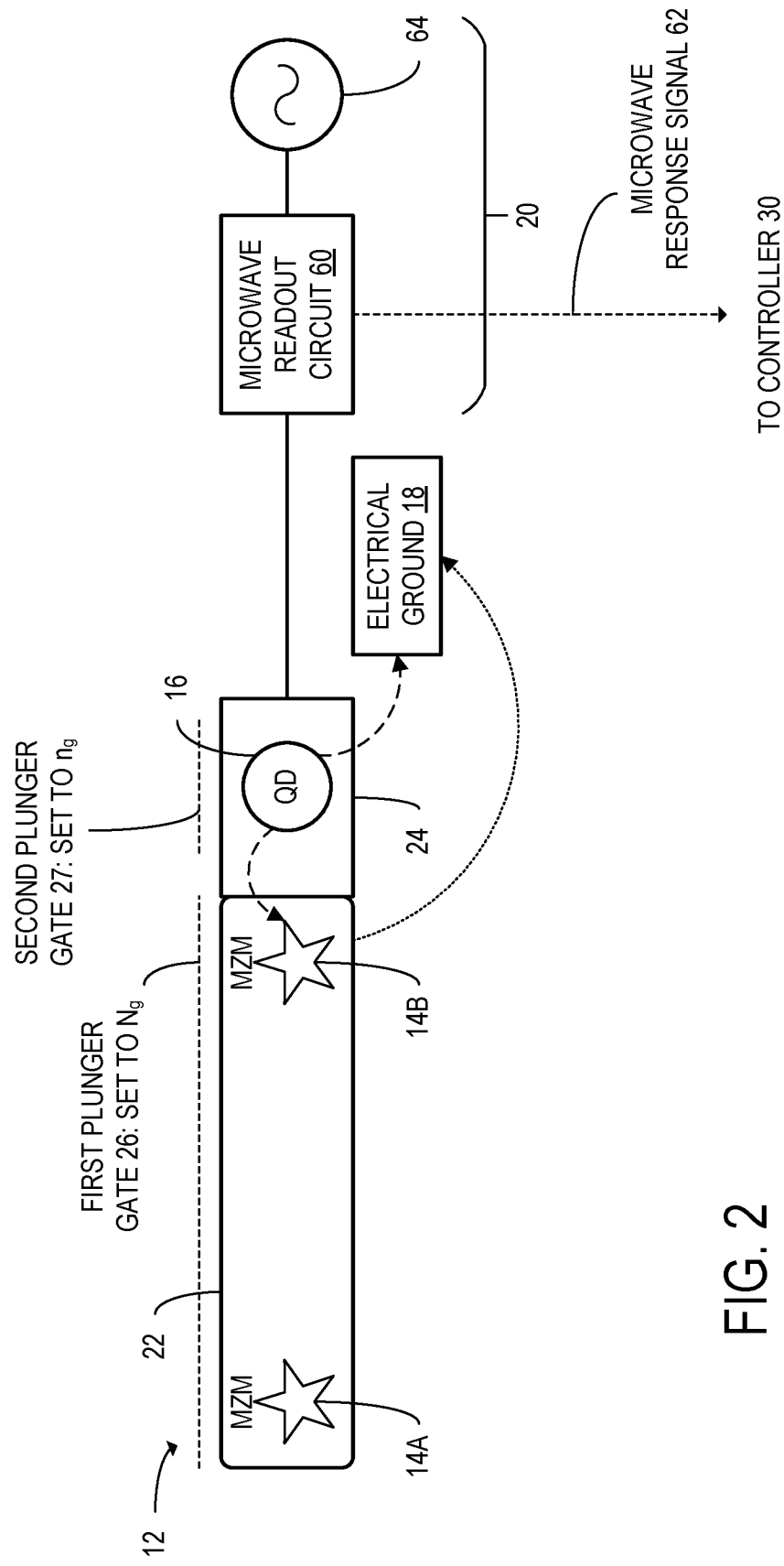
FIG. 2 schematically shows the Majorana island in an example in which the Majorana island is a coherent link, according to the example of FIG. 1.

FIG. 2 schematically shows the Majorana island 12 in additional detail in an example in which the Majorana island 12 is a coherent link. The coherent link includes a topological superconducting nanowire 22 at which a first MZM 14A and a second MZM 14B are configured to form. The QD 16 is located within a semiconductor region 24 proximate to the second MZM 14B. In addition, the electrical ground 18 is tunably coupled to the Majorana island 12. This tunable coupling passes through the QD 16 in some examples.

FIG. 2 further shows a first plunger gate 26 located proximate to the topological superconducting nanowire 22 and a second plunger gate 27 located proximate to the semiconductor region 24. Via the first plunger gate 26 and the second plunger gate 27, respectively, the first plunger gate voltage $N_g$ and the second plunger gate voltage $n_g$ are applied to the Majorana island 12 and the QD 16 as a Majorana island plunger gate voltage and a QD plunger gate voltage.

The capacitance sensor 20, as shown in the example of FIG. 2, includes a microwave readout circuit 60 configured to output a microwave response signal 62 based at least in part on a quantum capacitance of the Majorana island 12 and the QD 16. The microwave readout circuit 60 shown in FIG. 2 is coupled to an alternating current (AC) voltage source 64 that is configured to supply an AC driving voltage to the microwave readout circuit 60. The microwave readout circuit 60 shown in the example of FIG. 2 is capacitively coupled to the QD 16.

Figure 3:
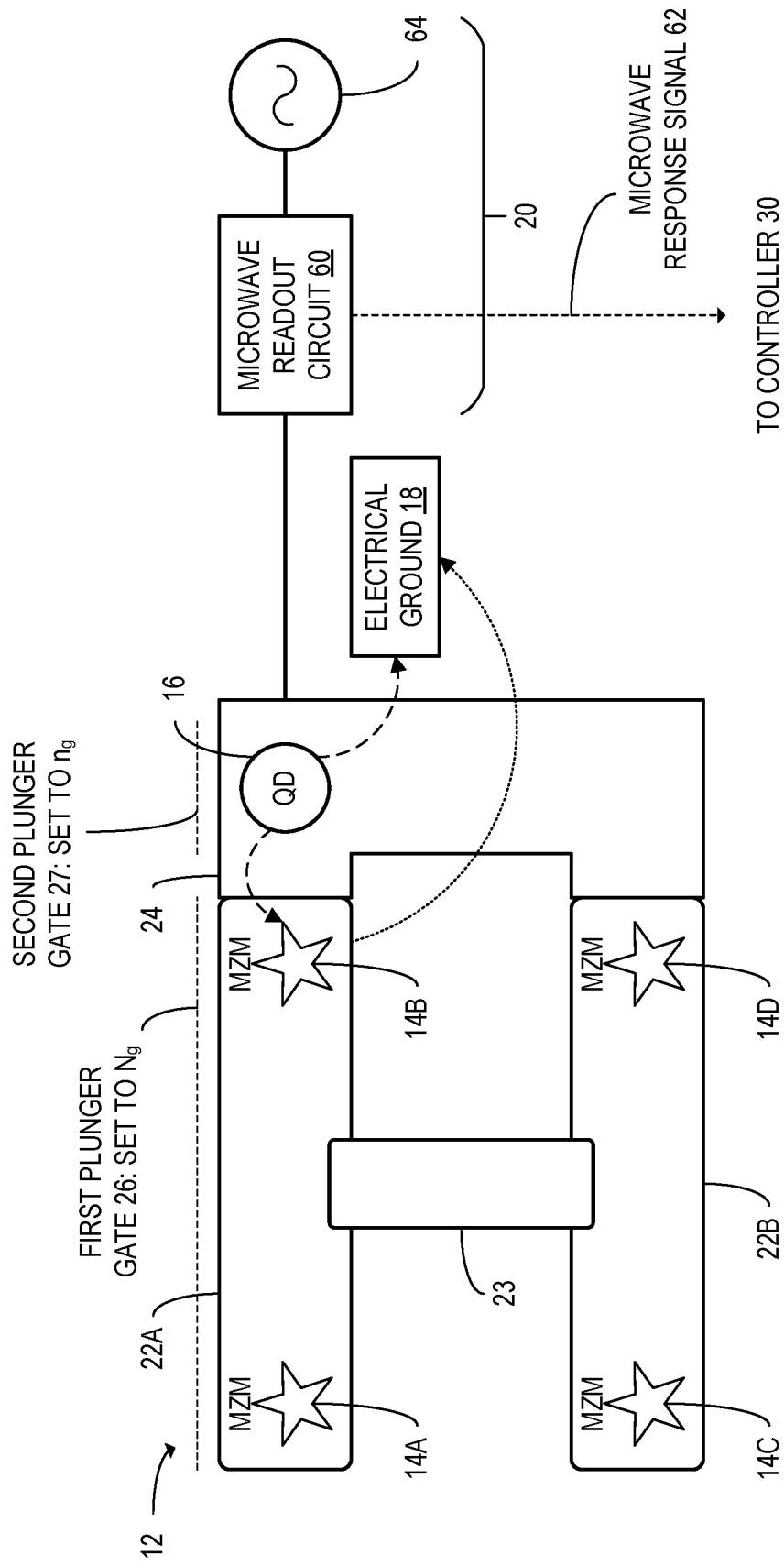
FIG. 3 schematically shows the Majorana island in an example in which the Majorana island is a Majorana tetron, according to the example of FIG. 1.

FIG. 3 schematically shows an example of the Majorana island 12 in which the Majorana island 12 is a Majorana tetron. The Majorana tetron shown in FIG. 3 includes a first topological superconducting nanowire 22A and a second topological superconducting nanowire 22B coupled by a trivial superconducting nanowire 23. A first MZM 14A and a second MZM 14B are configured to form at the ends of the first topological superconducting nanowire 22A, and a third MZM 14C and a fourth MZM 14D are configured to form at the ends of the second topological superconducting nanowire 22B.

Figure 4:
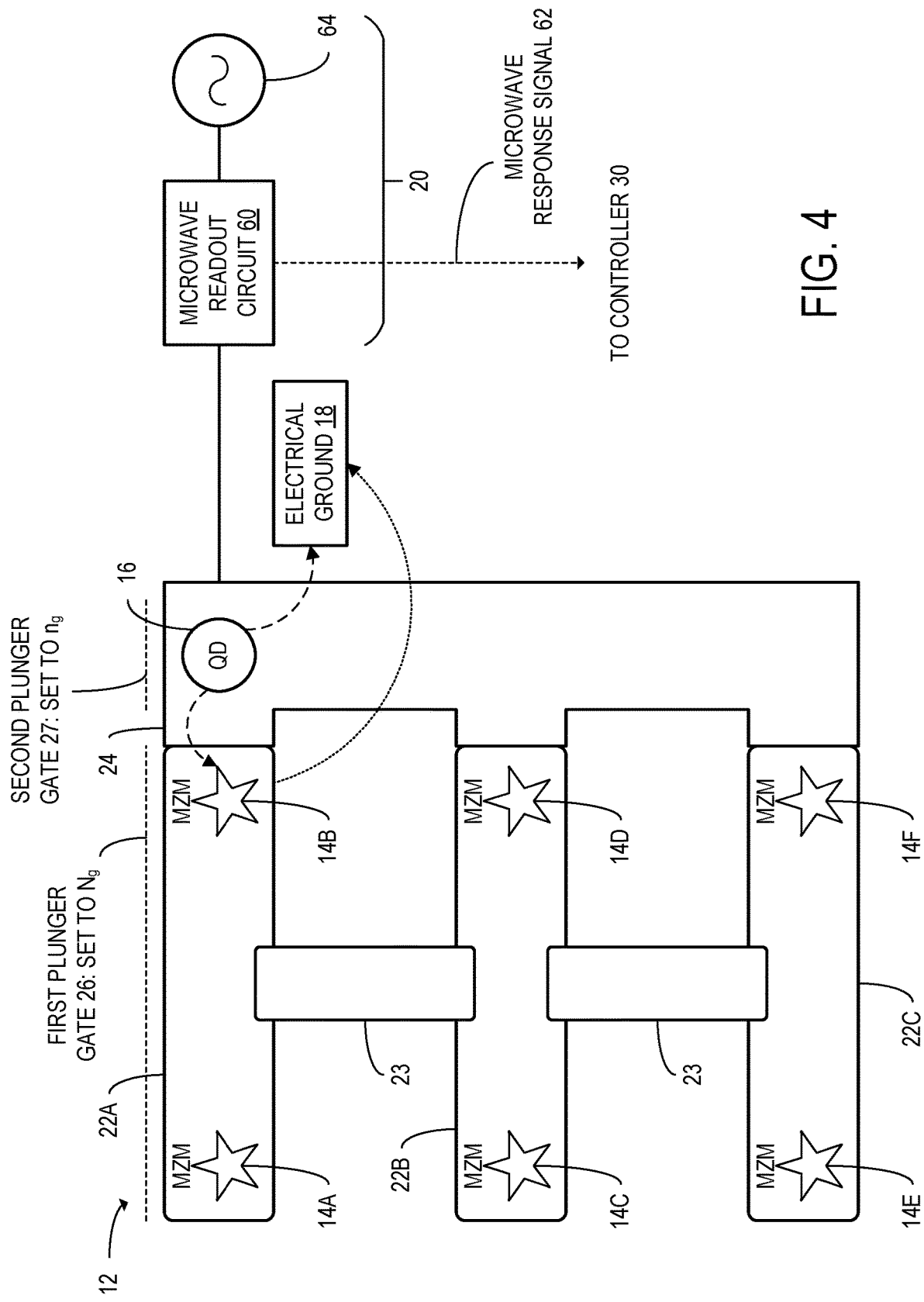
FIG. 4 schematically shows the Majorana island in an example in which the Majorana island is a Majorana hexon, according to the example of FIG. 1.

FIG. 4 schematically shows another example of the Majorana island 12 in which the Majorana island 12 is a Majorana hexon. The Majorana hexon of FIG. 4 includes a first topological superconducting nanowire 22A, a second topological superconducting nanowire 22B, and a third topological superconducting nanowire 22C. A first MZM 14A and a second MZM 14B are configured to form at the ends of the first topological superconducting nanowire 22A, a third MZM 14C and a fourth MZM 14D are configured to form at the ends of the second topological superconducting nanowire 22B, and a fifth MZM 14E and a sixth MZM 14F are configured to form at the ends of the third topological superconducting nanowire 22C. The Majorana hexon further includes trivial superconducting nanowires 23 that respectively couple the first topological superconducting nanowire 22A to the second topological superconducting nanowire 22B and couple the second topological superconducting nanowire 22B to the third topological superconducting nanowire 22C.

Although not shown in FIGS. 2-4 in the interest of clarity, the quantum computing device 10 may include respective QDs 16 located proximate to each of the MZMs 14. These QDs 16 may each be connectable to corresponding capacitance sensors 20 and to the electrical ground 18 as well as to the MZMs 14 proximate to which they are located. In addition, a corresponding first plunger gate 26 may be located proximate to each of the topological superconducting nanowires 22, and a corresponding second plunger gate 27 may be located proximate to each of the QDs 16.

Returning to FIG. 1, the resonance region identification performed at the controller 30 is discussed below. The controller 30 is configured to identify a plurality of resonance regions 44 in the microwave response signals 62 that are used to obtain the quantum capacitance measurements 40. Each of the resonance regions 44 is a region located around a peak in a capacitance curve formed by the plurality of quantum capacitance measurements 40. Thus, each resonance region 44 is an approximation of a location of the resonance peak. These resonance regions 44 are identified in respective sampling iterations 42. The resonance regions 44 identified in the sampling iterations 42 may correspond to fermion numbers of the Majorana island 12.

Figure 5:
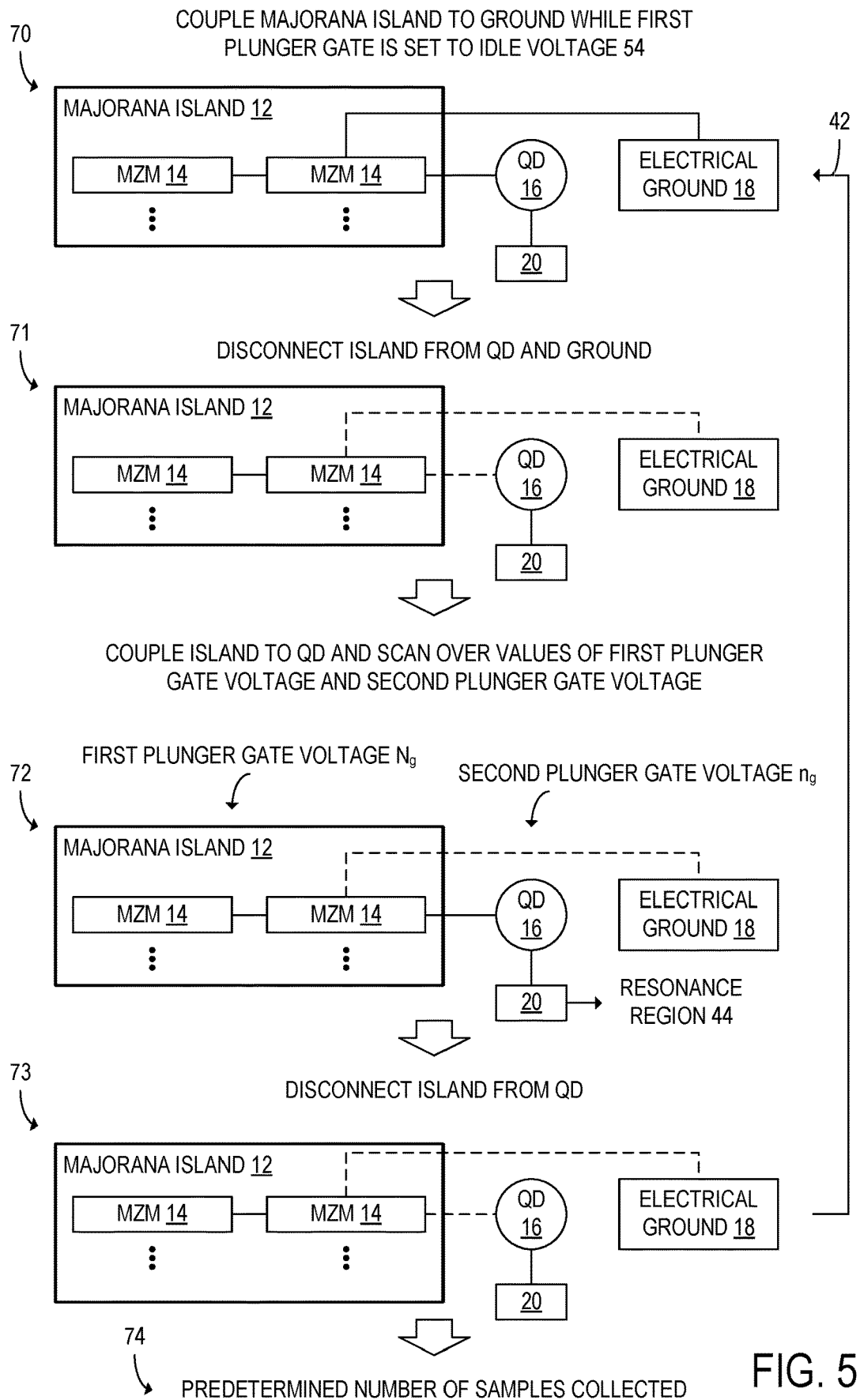
FIG. 5 schematically shows steps that may be performed at the quantum computing device during each of a plurality of sampling iterations when calibrating the quantum computing device, according to the example of FIG. 1.

FIG. 5 shows steps that the controller 30 may be configured to control the quantum computing device 10 to perform during each of the sampling iterations 42. At step 70, the sampling iteration 42 may include electrically coupling the Majorana island 12 to the electrical ground 18 while the first plunger gate 26 is set to an idle voltage 54. The idle voltage 54 may be a first plunger gate voltage $N_g$ that is applied when no measurement is being performed at the Majorana island 12. The resonance regions 44 identified in the steps shown in FIG. 5 may be specific to the value of the idle voltage 54 used in step 70. Accordingly, the fermion number of the Majorana island 12 may be reset. The fermion numbers of the Majorana island 12 subsequently to resetting may follow a thermal distribution 46, as discussed in further detail below.

At step 71, the sampling iteration 42 may further include disconnecting the Majorana island 12 from the electrical ground 18. When step 71 is performed, the electrical connections between the Majorana island 12 and the QD 16 and between the QD 16 and the electrical ground 18 may both be opened.

At step 72, the sampling iteration 42 may further include electrically coupling the Majorana island 12 to the QD 16. In addition, at step 72, the controller 30 may be configured to control the quantum computing device 10 to scan over a plurality of values of the first plunger gate voltage $N_g$ and the second plunger gate voltage $n_g$ using the capacitance sensor 20. As shown in FIG. 1, the controller 30 may accordingly obtain a plurality of quantum capacitance measurements 40 of the Majorana island 12 and the QD 16 at the scanned values of the first plunger gate voltage $N_g$ and the second plunger gate voltage $n_g$. During the scan, the quantum computing device 10 may be configured to scan over the plurality of values of the first plunger gate voltage $N_g$ and the second plunger gate voltage $n_g$ until a resonance region 44 over the measured values of the quantum capacitance is identified. Scanning over a plurality of values of the first plunger gate voltage $N_g$ and the second plunger gate voltage $n_g$, as discussed herein, refers to scanning a plurality of different voltage value pairs that each include respective values of $N_g$ and $n_g$, and may be performed by varying either or both of $N_g$ and $n_g$ over the course of scanning. The quantum computing device 10 is further configured to output, to the controller 30, respective quantum capacitance measurements 40 obtained at the plurality of values of the first plunger gate voltage $N_g$ and the second plunger gate voltage $n_g$.

In some examples, when step 72 is performed, the controller 30 may be further configured to control the quantum computing device 10 to set the first plunger gate voltage $N_g$ to a predetermined first plunger gate voltage $N_g$ during scanning over the plurality of values of the second plunger gate voltage $n_g$. Accordingly, the first plunger gate voltage $N_g$ may be kept fixed during step 72. In such examples, the predetermined value of the first plunger gate voltage $N_g$ may differ from the idle voltage 54.

At step 73, the controller 30 is further configured to control the quantum computing device 10 to return the first plunger gate 26 to the idle voltage 54 and disconnect the Majorana island from the QD 16. The controller 30 may also reset the second plunger gate voltage $n_g$ to an idle value.

Steps 70, 71, 72, and 73, as shown in FIG. 5, may be performed during calibration of the quantum computing device 10. In such examples, at step 74, the controller 30 may be further configured to obtain a predetermined number of sample values of the first plunger gate voltage $N_g$ and the second plunger gate voltage $n_g$ located within the resonance regions 44, as well as the corresponding values of the quantum capacitance. As depicted in FIG. 1, the controller 30 is further configured to receive the quantum capacitance measurements 40, and, based at least in part on the quantum capacitance measurements 40, identify a respective plurality of resonance regions 44 associated with the sampling iterations 42. The resonance regions 44 may correspond to values of a fermion number N of the Majorana island 12.

Based at least in part on the quantum capacitance measurements 40, the controller 30 is further configured to determine a measured distribution 46 of a respective plurality of resonance regions 44 associated with the sampling iterations 42. In some examples, the measured distribution 46 is a thermal distribution. The thermal distribution may be a Gibbs distribution, defined as:

$$p_N = \frac{e^{-\beta E(N)}}{\sum_{M \in \mathbb{Z}} e^{-\beta E(M)}}$$

where $p_N$ is the probability of the Majorana island 12 having a fermion number N. By convention, the fermion number N for which the energy of the Majorana island 12 is minimized is defined as N=0. In addition, $\beta=1/k_B T$, where $K_B$ is the Boltzmann constant and T is the temperature, and E (N) is the charging energy of the Majorana island 12 as a function of N.

Based at least in part on the thermal distribution 46, the controller 30 is further configured to identify a minimum-energy resonance region 52 of the plurality of resonance regions 44 that corresponds to a minimum energy value 50 of the Majorana island 12. The charging energy of the Majorana island 12 may be approximated as:

$$E(N) = E_C(N - N_g)^2$$

In this example, the first plunger gate voltage $N_g$ is expressed in dimensionless form, and $E_C$ is a unit charging energy value.

Figure 6:
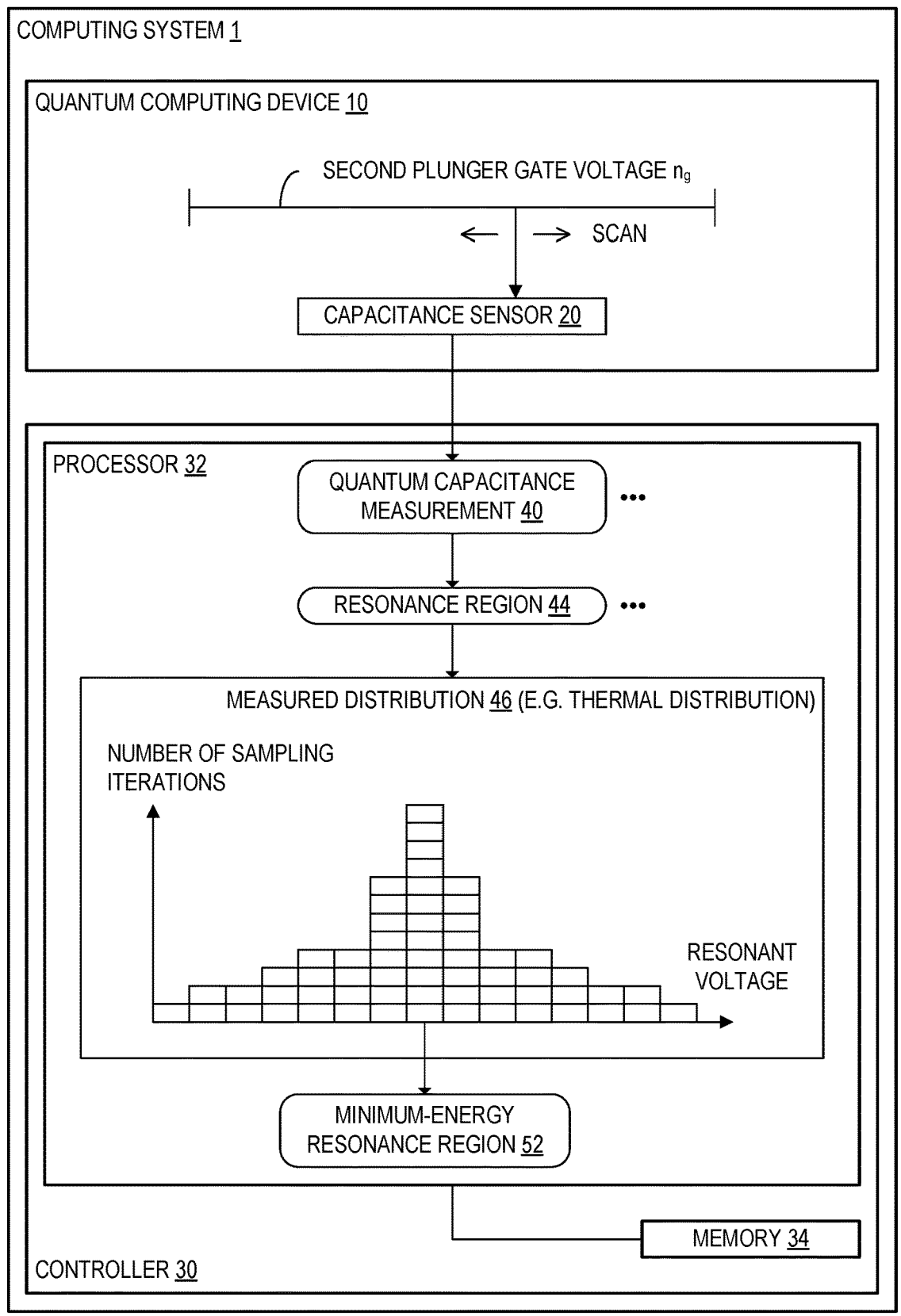
FIG. 6 schematically shows the computing system when the controller identifies a minimum-energy resonance region, according to the example of FIG. 1.

FIG. 6 schematically shows the computing system 1 when the controller 30 identifies the minimum-energy resonance region 52. As depicted in FIG. 6, the resonance regions 44 identified by scanning over values of the second plunger gate voltage $n_g$ in each of the sampling iterations 42 are distributed according to a thermal distribution. In the measured distribution 46, the values of the resonant voltage may be bucketed into ranges corresponding to different values of the fermion number N. The measured distribution 46 may indicate the number of sampling iterations 42 in which a respective resonance region 44 is detected within each of these ranges. Thus, the measured distribution 46 may indicate respective frequencies with which a plurality of different fermion numbers N are sampled.

The minimum-energy resonance region 52 that corresponds to the minimum energy value 50 may be the resonance region 44 of the plurality of resonance regions 44 that has a highest frequency in the thermal distribution. As depicted in the example of FIG. 6, the minimum-energy resonance region 52 is the resonance region 44 with a corresponding resonant voltage that was detected in the highest number of sampling iterations 42.

Returning to the example of FIG. 1, subsequently to determining the minimum-energy resonance region 52, the controller 30 is further configured to output a minimum-energy resonance region identification 48 that indicates the minimum-energy resonance region 52. The minimum-energy resonance region identification 48 may include the values of the first plunger gate voltage $N_g$ and the second plunger gate voltage $n_g$ that are identified as resonance values. Ranges of values of $N_g$ and $n_g$ in a vicinity of the minimum-energy resonance region 52 may be indicated in the minimum-energy resonance region identification 48 in some examples.

Figure 7:
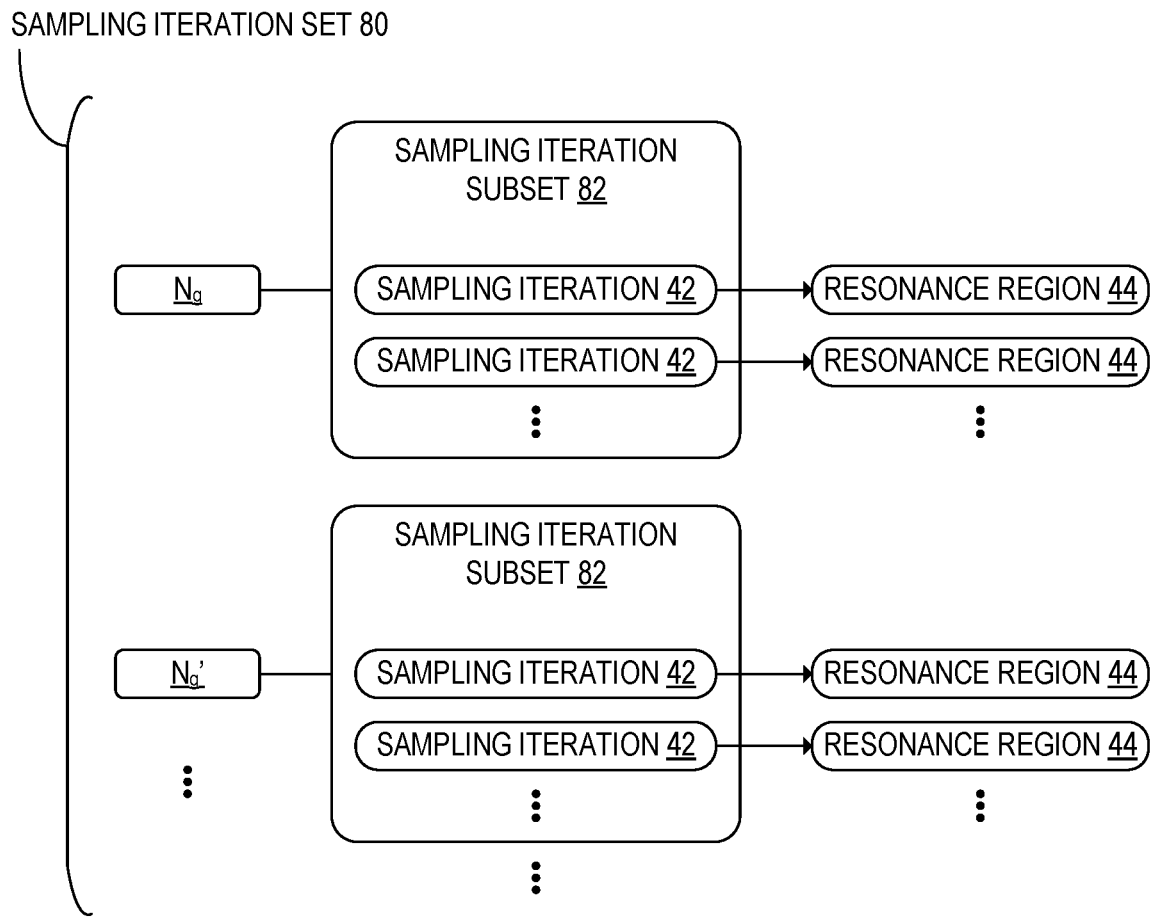
FIG. 7 schematically shows a sampling iteration set including a plurality of sampling iteration subsets at which a first plunger gate located proximate to the Majorana island is set to different respective first plunger gate voltages, according to the example of FIG. 1.

FIG. 7 schematically shows a sampling iteration set 80 including a plurality of sampling iteration subsets 82 at which the Majorana island 12 is set to different respective first plunger gate voltages $N_g$ in different respective sampling iterations 42 when scanning for resonance regions 44 in step 72. The sampling iteration set 80 includes each of the sampling iterations 42. In the example of FIG. 7, rather than using the same value of the first plunger gate voltage $N_g$ in each of the sampling iterations 42, the controller 30 may be configured to control the quantum computing device 10 to identify the resonance regions 44 at a plurality of different first plunger gate voltages $N_g$. In such examples, the controller 30 may be configured to control the quantum computing device 10 to set the first plunger gate voltage $N_g$ to a plurality of different values in a corresponding plurality of sampling iteration subsets 82 of the sampling iteration set 80. In the example of FIG. 7, the first plunger gate voltage $N_g$ is shown changing to a value $N_g'$ when a new sampling iteration subset 82 begins. Using a plurality of sampling iteration subsets 82 that have different values of the first plunger gate voltage $N_g$, the controller 30 may be configured to collect larger samples of resonance regions 44 corresponding to fermion numbers other than N=0.

In other examples in which the first plunger gate voltage $N_g$ is modified during scanning at step 72 instead of the second plunger gate voltage $n_g$, the controller 30 may be further configured to control the quantum computing device 10 to use different values of the second plunger gate voltage $n_g$ in different sampling iteration subsets 82. In still other examples, both the first plunger gate voltage $N_g$ and the second plunger gate voltage $n_g$ may be modified over the plurality of sampling iterations 42.

Figure 8:
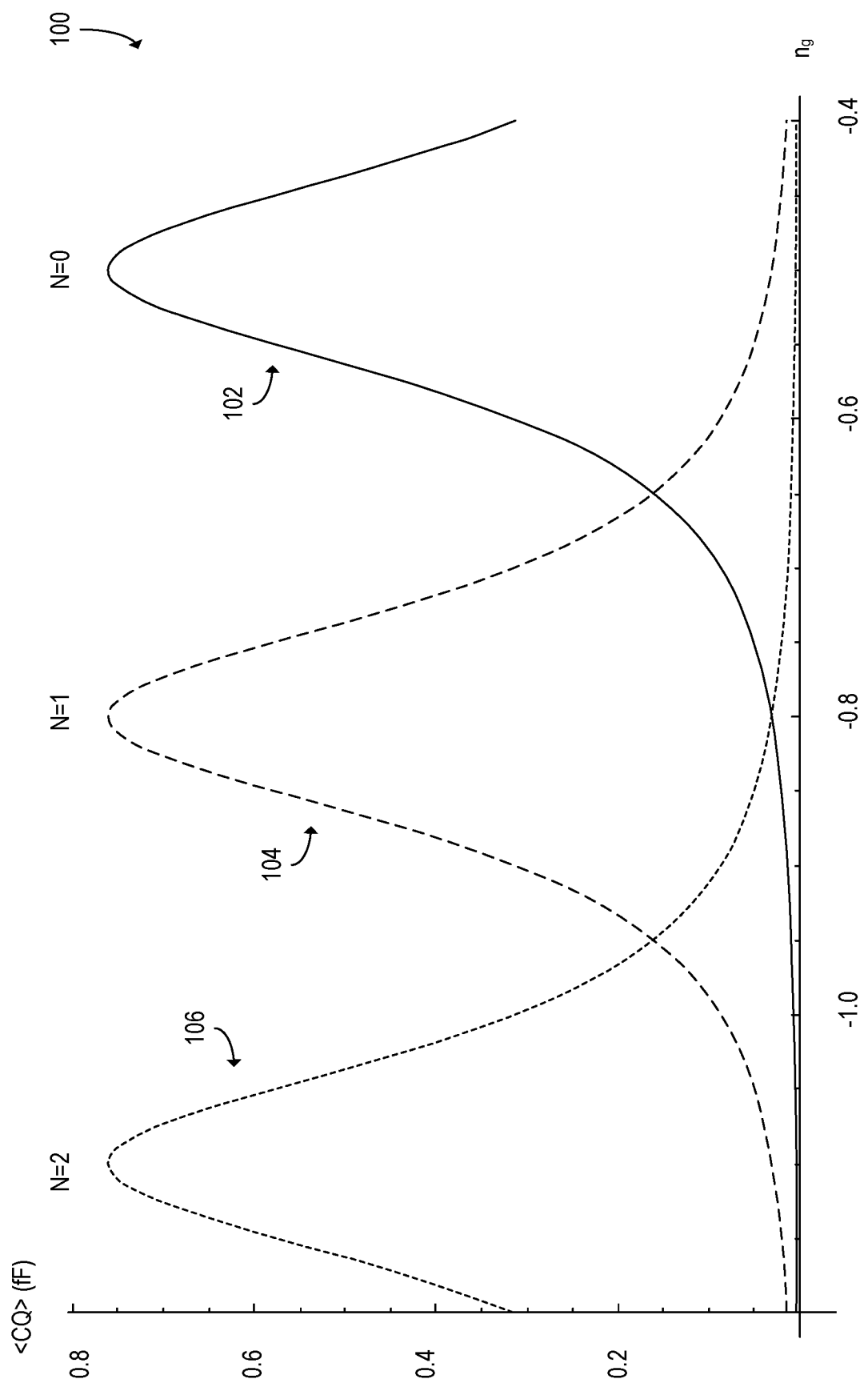
FIG. 8 shows an example resonance region plot that depicts resonance regions corresponding to different values of a fermion number of the Majorana island, according to the example of FIG. 1.

FIG. 8 shows an example resonance region plot 100 that depicts resonance regions 44 corresponding to different values of the fermion number N. FIG. 8 shows respective capacitance curves 102, 104, and 106 that plot thermally averaged quantum capacitance $\langle C_Q \rangle$ as a function of the second plunger gate voltage $n_g$ for N=0, N=1, and N=2. The capacitance curves 102, 104, and 106 have different values of the second plunger voltage $n_g$ at which their peak capacitance values occur. The first plunger gate voltage $N_g$ is held constant in the example of FIG. 8. Accordingly, by varying the value of the second plunger voltage $n_g$, the controller 30 may distinguish between the different values of N.

Figure 9:
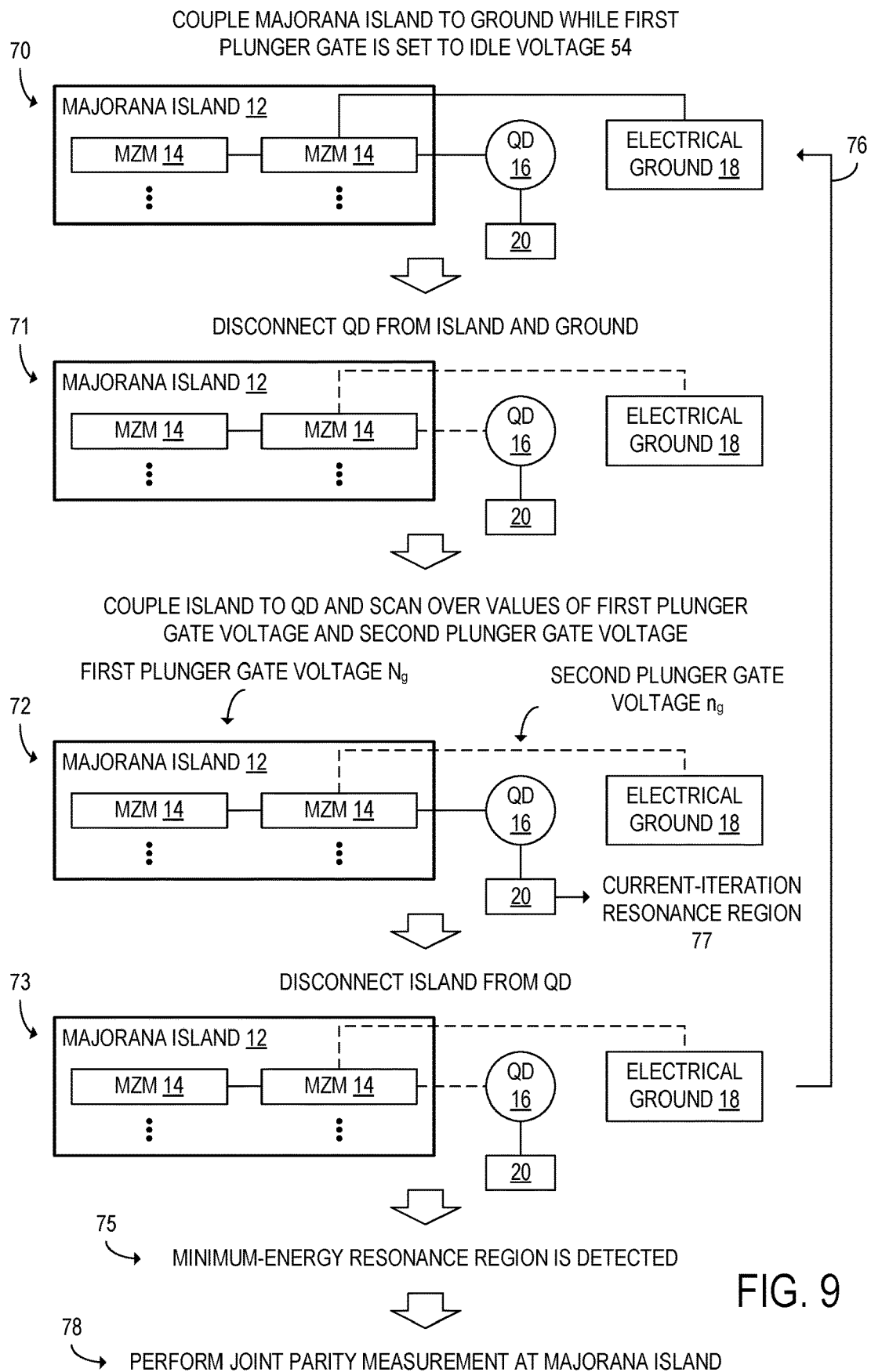
FIG. 9 schematically shows steps that may be performed at the quantum computing device when the fermion number of the Majorana island is initialized prior to a joint parity measurement, according to the example of FIG. 1.

FIG. 9 shows steps that may be performed when the fermion number of the Majorana island 12 is initialized prior to a joint parity measurement 78 performed at the Majorana island 12. In the example of FIG. 9, steps 70, 71, 72, and 73 as discussed above with reference to FIG. 5 may be performed in each of one or more initialization iterations 76 to initialize the fermion number of the Majorana island 12. During each initialization iteration 76, at step 70, the controller 30 may be further configured to control the quantum computing device to electrically couple the Majorana island 12 to the electrical ground 18 while the first plunger gate 26 is set to the idle voltage 54. At step 71, each of the initialization iterations 76 may further include disconnecting the Majorana island 12 from the electrical ground 18. At step 72, each of the initialization iterations 76 may further include scanning over a plurality of current-iteration values of the first plunger gate voltage $N_g$ and the second plunger gate voltage $n_g$ to identify a current-iteration resonance region 77. At step 73, each of the initialization iterations 76 may further include disconnecting the Majorana island 12 from the electrical ground 18.

The controller 30 may be configured to control the quantum computing device 10 to perform the one or more initialization iterations 76 until the controller identifies a current-iteration resonance region 77 as the minimum-energy resonance region 52. Accordingly, the controller 30 may detect that the Majorana island has the minimum-energy fermion number N=0 corresponding to the value of the idle voltage 54 used in step 70. If the controller 30 detects a current-iteration resonance region 77 corresponding to some other fermion number N, the controller 30 may control the quantum computing device 10 to perform another initialization iteration 76. Thus, the controller 30 may be configured to set the quantum computing device 10 to the minimum-energy fermion number N=0 prior to the joint parity measurement 78.

Figure 10:
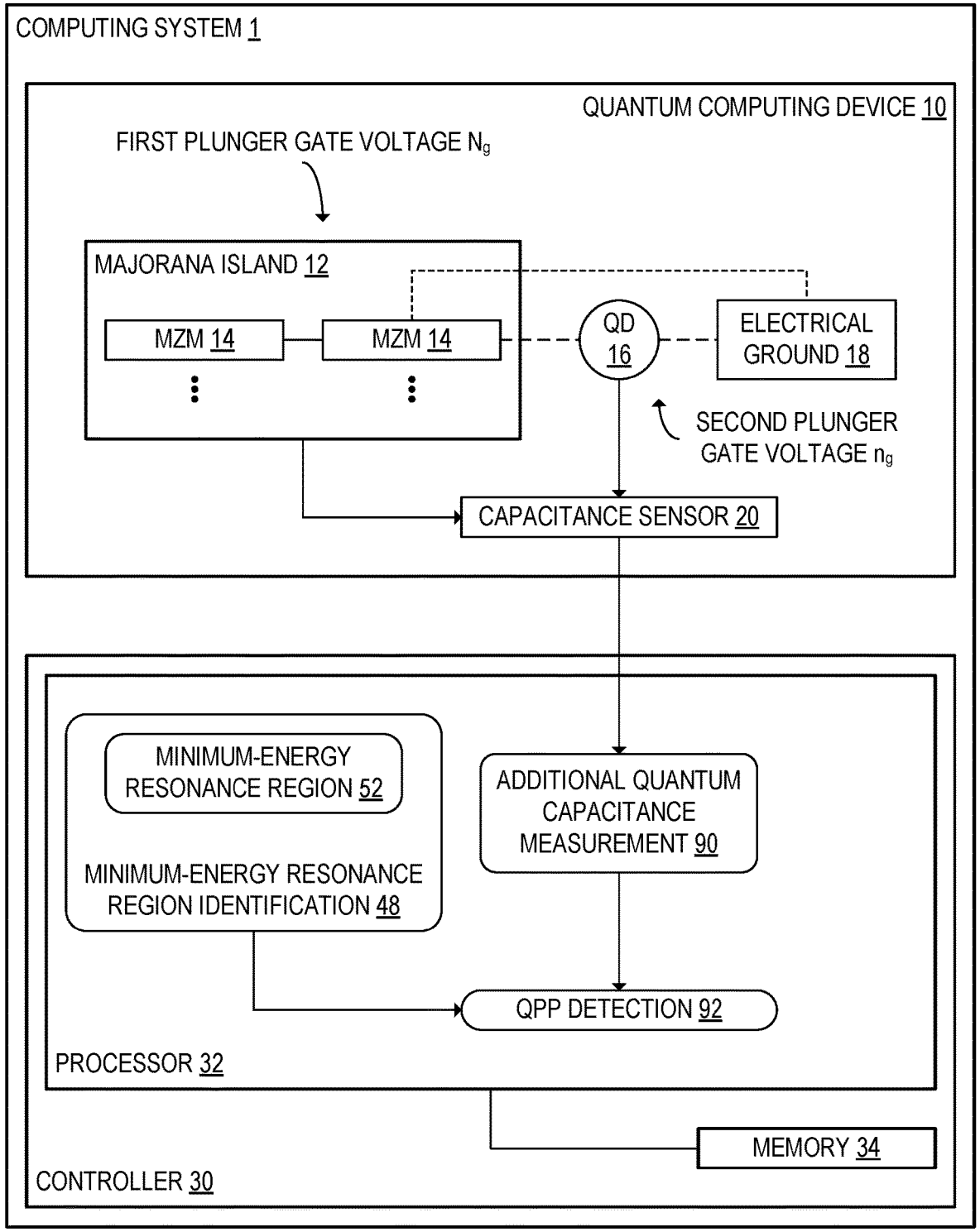
FIG. 10 schematically shows the computing system in an example in which controller is further configured to perform a quasiparticle poisoning detection at the Majorana island subsequently to performing the joint parity measurement, according to the example of FIG. 1.

FIG. 10 schematically shows the computing system 1 in an example in which controller 30 is further configured to perform a QPP detection 92 at the Majorana island 12 subsequently to performing the joint parity measurement 78 at the Majorana island 12. When the controller 30 performs the QPP detection 92, the controller 30 may be further configured to control the quantum computing device 10 to obtain an additional quantum capacitance measurement 90 of the Majorana island 12. This additional quantum capacitance measurement 90 may be obtained at the value of the first plunger gate voltage $N_g$ used during calibration of the quantum computing device 10, and at the value of the second plunger gate voltage $n_g$ identified as the voltage at which the minimum-energy resonance region 52 occurs.

The controller 30 may be further configured to determine whether QPP has occurred at the Majorana island 12 based at least in part on the additional quantum capacitance measurement 90 and the minimum-energy resonance region identification 48. The controller 30 may be configured to determine whether QPP has occurred by determining whether the additional quantum capacitance measurement 90 is approximately equal to the resonance region value of the quantum capacitance obtained during calibration. Accordingly, the controller 30 may be configured to determine whether the Majorana island 12 is in its minimum-energy state. When the controller 30 detects the minimum-energy resonance region 52, the QPP detection 92 may indicate that QPP has not occurred. When the controller 30 does not detect the minimum-energy resonance region 52, the QPP detection 92 may indicate that QPP has occurred. Accordingly, the controller 30 may be configured to determine whether QPP occurred at the Majorana island 12 when the joint parity measurement 78 was performed.

Figure 11A:
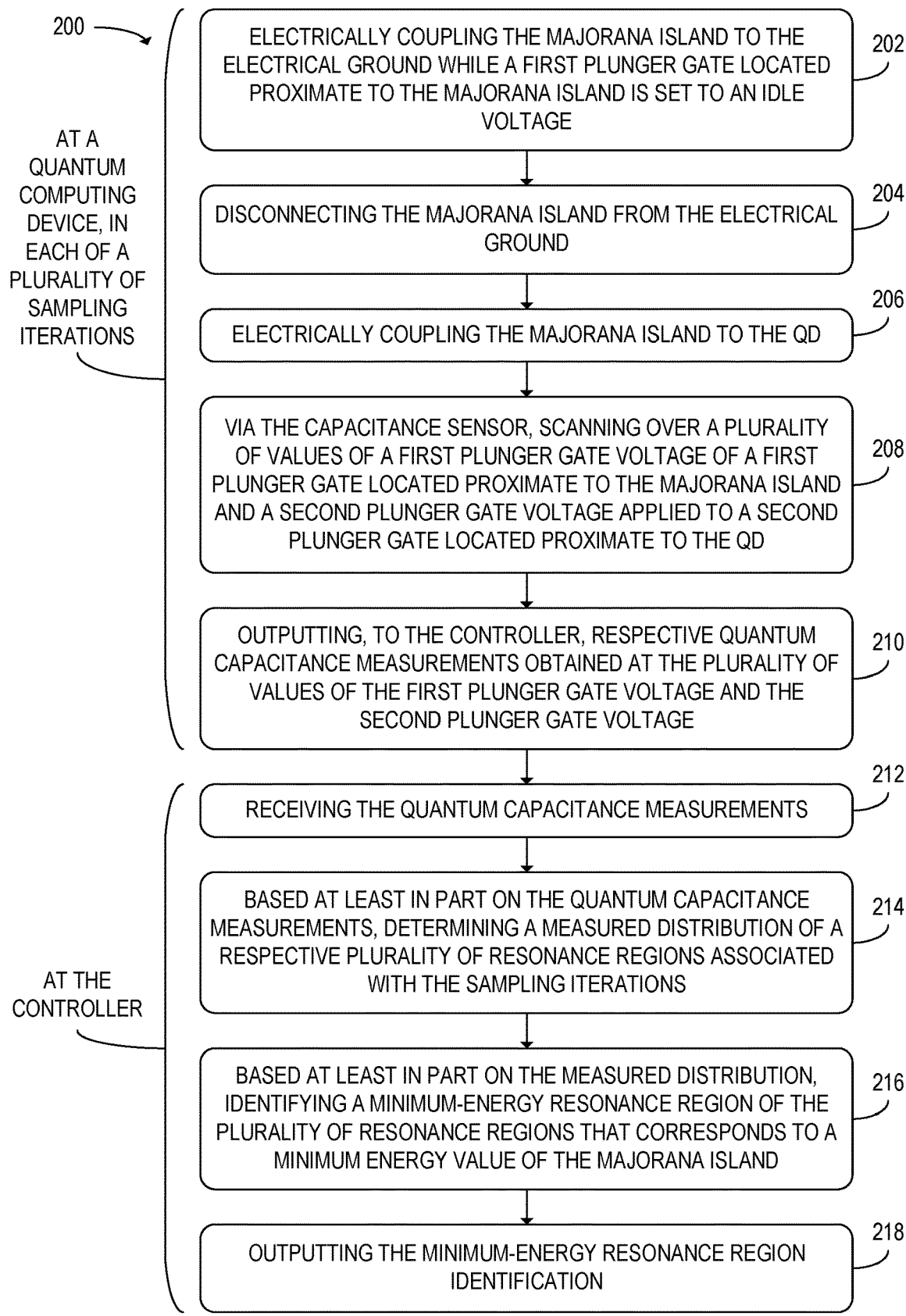
FIG. 11A shows a flowchart of a method for use with a computing system including a quantum computing device and a controller, according to the example of FIG. 1.

FIG. 11A shows a flowchart of a method 200 for use with a computing system including a quantum computing device and a controller. The steps of the method 200 may be performed when calibrating the quantum computing device in order to identify resonance regions corresponding to different fermion numbers of the Majorana island. The method 200 may additionally or alternatively be performed to initialize the fermion number of the Majorana island prior to performing a joint parity measurement.

The quantum computing device used when performing the method 200 includes a Majorana island at which a plurality of MZMs are instantiated. The quantum computing device further includes a QD configured to be electrically connectable to the Majorana island via an MZM of the plurality of MZMs. In addition, the quantum computing device includes an electrical ground that is electrically connectable to the Majorana island (e.g., directly or via the QD), as well as a capacitance sensor configured to measure a quantum capacitance of the QD and the Majorana island. For example, the capacitance sensor may include a microwave readout circuit configured to output a microwave response signal based at least in part on a quantum capacitance of the Majorana island and the QD.

Steps 202, 204, 206, 208, and 210 of the method 200 are performed at the quantum computing device in each of a plurality of sampling iterations. At step 202, the method 200 includes electrically coupling the Majorana island to the electrical ground. This electrical coupling is performed while a first plunger gate located proximate to the Majorana island is set to an idle voltage. At step 204, the method 200 further includes disconnecting the Majorana island from the electrical ground, and at step 206, the method 200 further includes electrically coupling the Majorana island to the QD. Accordingly, the Majorana island and the QD may reach thermal equilibrium with the electrical ground before the Majorana island is disconnected from the electrical ground and coupled to the QD to prepare the Majorana island for quantum capacitance measurement.

At step 208, the method 200 further includes, via the capacitance sensor, scanning over a plurality of values of a first plunger gate voltage of a first plunger gate located proximate to the Majorana island and a second plunger gate voltage applied to a second plunger gate located proximate to the QD. The first plunger gate voltage, the second plunger gate voltage, or both may be varied during the scanning. At step 210, the method 200 further includes outputting, to the controller, respective quantum capacitance measurements obtained at the plurality of values of the first plunger gate voltage and the second plunger gate voltage. Accordingly, the quantum capacitance of the Majorana island and the QD are measured for different combinations of values of the plunger gate voltages. The Majorana island may be disconnected from the QD subsequently to locating the resonance region.

Steps 212, 214, 216, and 218 of the method 200 are performed at the controller. At step 212, the method 200 further includes receiving the quantum capacitance measurements from the capacitance sensor. As discussed above, the quantum capacitance measurements may be received in the form of microwave response signals.

At step 214, the method 200 further includes, based at least in part on the quantum capacitance measurements, determining a measured distribution of a respective plurality of resonance regions associated with the sampling iterations. The controller may identify a resonance region by identifying the values of the first plunger gate voltage and the second plunger gate voltage for which the highest value of the quantum capacitance is measured in a given sampling iteration. The measured distribution is constructed over the course of the plurality of sampling iterations as the quantum capacitance measurements are obtained. The resonance regions associated with the sampling iterations may correspond to fermion numbers of the Majorana island.

At step 216, the method 200 further includes identifying a minimum-energy resonance region of the plurality of resonance regions based at least in part on the measured distribution. The minimum-energy resonance region corresponds to a minimum energy value of the Majorana island. In some examples, the measured distribution is a thermal distribution, which may be a Gibbs distribution. The minimum-energy resonance region may, in such examples, be the resonance region of the plurality of resonance regions that has a highest frequency in the thermal distribution. Fitting the resonance regions to the thermal distribution may include bucketing the resonant values of the first plunger gate voltage and the second plunger gate voltage into ranges corresponding to different fermion numbers of the Majorana island. The thermal distribution may indicate respective frequencies, across the plurality of sampling iterations, with which resonance regions within those plunger gate voltage ranges are measured.

At step 218, the method 200 further includes outputting the minimum-energy resonance region identification. Thus, the controller calibrates the quantum computing device by approximating the plunger gate voltages and corresponding quantum capacitance when the Majorana island has a minimum energy value.

Figure 11B:
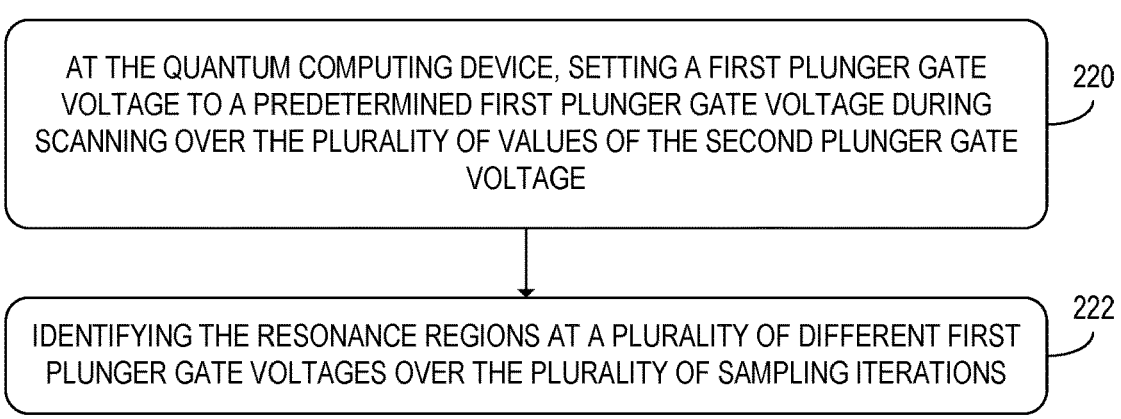
FIG. 11B shows additional steps of the method of FIG. 11A that may be performed in some examples.

FIG. 11B shows additional steps of the method 200 that may be performed in some examples. At step 220, the method 200 may further include, at the quantum computing device, setting a first plunger gate voltage of the Majorana island to a predetermined first plunger gate voltage during scanning over the plurality of values of the second plunger gate voltage. Step 220 may be performed during step 208. Thus, the quantum computing device may control for the value of the first plunger gate voltage when scanning for the resonance region.

At step 222, the method 200 may further include identifying the resonance regions at a plurality of different first plunger gate voltages over the plurality of sampling iterations. Step 222 may be performed during step 214. When step 222 is performed, the first plunger gate voltage may be set to different values in different subsets of the set of sampling iterations. Accordingly, the controller may obtain larger sample sizes for values of the fermion number other than the value corresponding to the minimum-energy resonance region. These larger sample sizes may allow the controller to more accurately calibrate the quantum computing device for identification of QPP.

Figure 11C:
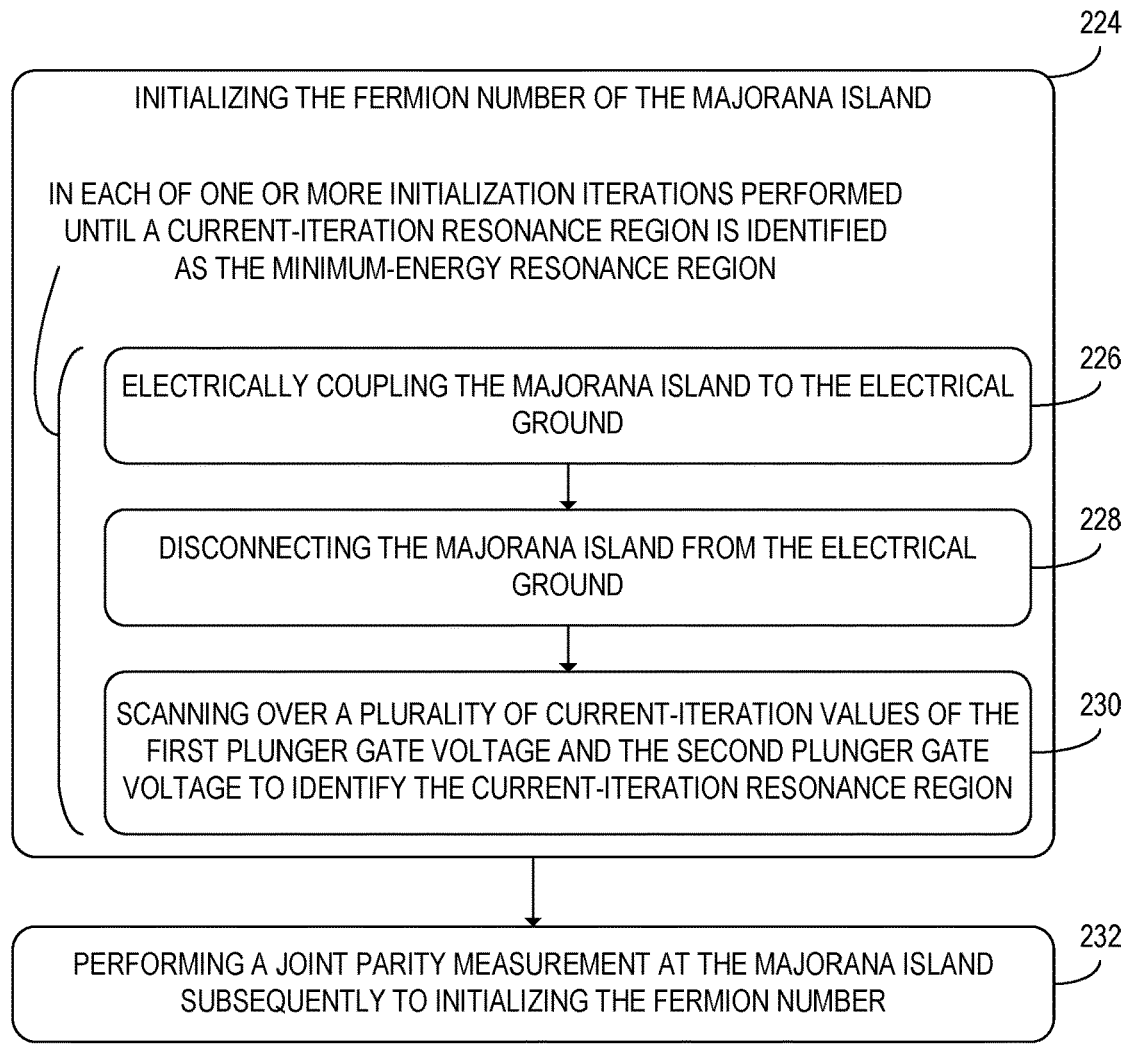
FIG. 11C shows additional steps of the method of FIG. 11A that may be performed in some examples subsequently to calibration of the quantum computing device.

FIG. 11C shows additional steps of the method 200 that may be performed in some examples subsequently to calibration. At step 224, the method 200 may further include initializing the fermion number of the Majorana island. Initializing the fermion number may include performing steps 226, 228, and 230 in each of one or more initialization iterations. The one or more initialization iterations may be performed in a loop that includes steps 226, 228, and 230 until a current-iteration resonance region measured in a current initialization iteration is identified as the minimum-energy resonance region. When the minimum-energy resonance region is detected, the controller may detect that the fermion number of the Majorana island has its minimum-energy value.

At step 226, step 224 may include electrically coupling the Majorana island to the electrical ground. At step 228, step 224 may further include disconnecting the Majorana island from the electrical ground. At step 230, step 224 may further include scanning over a plurality of current-iteration values of the first plunger gate voltage and the second plunger gate voltage to identify the current-iteration resonance region. In some examples, subsequently to identifying the current-iteration resonance region, the Majorana island may be decoupled from the QD.

At step 232, the method 200 may further include performing a joint parity measurement at the Majorana island subsequently to initializing the fermion number. The joint parity measurement may be a measurement of the joint parity an MZM included in the Majorana island and one or more additional MZMs, which may be included in the same Majorana island or one or more additional Majorana islands. Thus, a quantum computation may be performed at the quantum computing device subsequently to initializing the fermion number of the Majorana island.

Figure 11D:
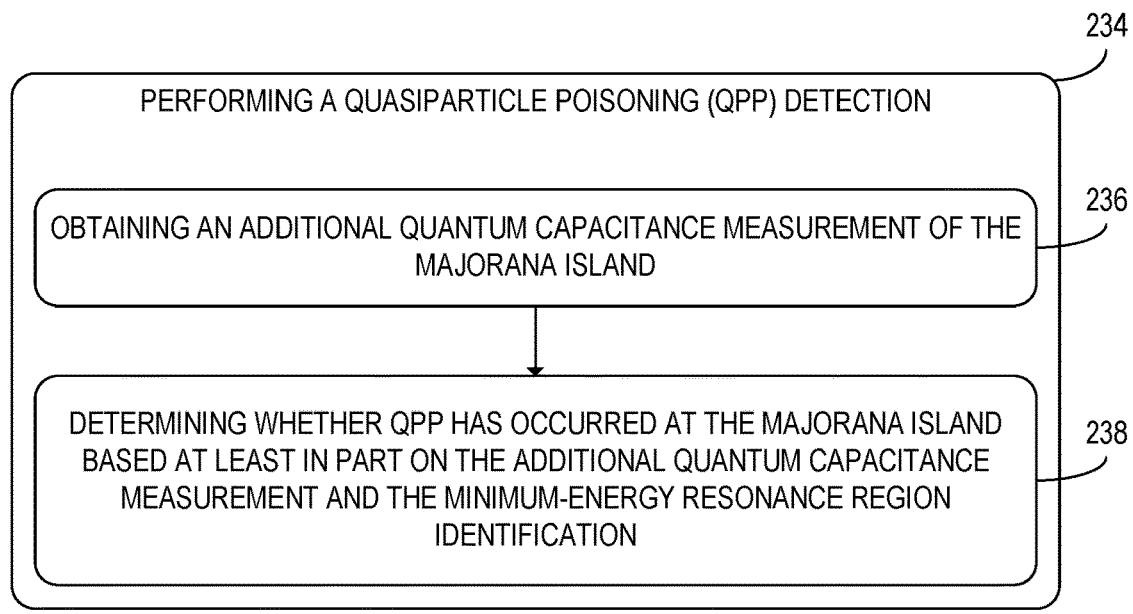
FIG. 11D shows further steps of the method of FIG. 11A that may be performed in some examples subsequently to a joint parity measurement.

FIG. 11D shows further steps of the method 200 that may be performed subsequently to step 232 in some examples. At step 234, the method 200 may further include performing a QPP detection at the Majorana island. Step 234 may include, at step 236, obtaining an additional quantum capacitance measurement of the Majorana island. The additional quantum capacitance measurement may be collected at the values of the first plunger gate voltage and the second plunger gate voltage corresponding to the minimum-energy resonance region. At step 238, step 234 may further include determining whether QPP has occurred at the Majorana island based at least in part on the additional quantum capacitance measurement and the minimum-energy resonance region identification. When step 238 is performed, the controller may determine whether resonance occurs at the previously identified minimum-energy resonant values of the first plunger gate voltage and the second plunger gate voltage. When such resonance occurs, the controller may determine that QPP has not occurred, and when such resonance does not occur, the controller may determine that QPP has occurred.

Using the systems and methods discussed above, a quantum computing device may be calibrated by identifying the first plunger gate voltage and the second plunger gate voltage that produce a resonance region when the Majorana island located proximate to the first plunger gate has a fermion number that minimizes the energy of the Majorana island. Resonant voltages for other values of the fermion number may similarly be identified. The systems and methods discussed above may also be used to initialize the fermion number of the Majorana island to the minimum-energy fermion number prior to performing a joint parity measurement.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
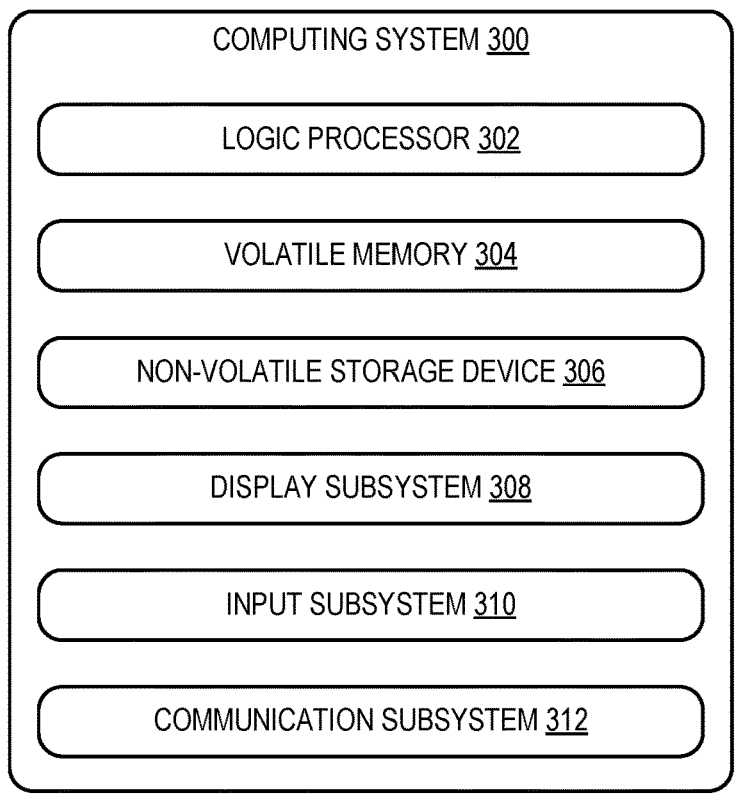
FIG. 12 shows a schematic view of an example computing environment in which the computing system of FIG. 1 may be instantiated.

FIG. 12 schematically shows a non-limiting embodiment of a computing system 300 that can enact one or more of the methods and processes described above. Computing system 300 is shown in simplified form. Computing system 300 may embody the computing system 1 described above and illustrated in FIG. 1. Components of computing system 300 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 12.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built in. Non-volatile storage device 306 may include optical memory, semiconductor memory, and/or magnetic memory, or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, camera, or microphone.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 300 to send and/or receive messages to and/or from other devices via a network such as the Internet.

The following paragraphs discuss several aspects of the present disclosure. According to one aspect of the present disclosure, a computing system is provided, including a quantum computing device. The quantum computing device includes a Majorana island at which a plurality of Majorana zero modes (MZMs) are instantiated. The quantum computing device further includes a quantum dot (QD) configured to be electrically connectable to the Majorana island via an MZM of the plurality of MZMs. The quantum computing device further includes an electrical ground and a capacitance sensor. The computing system further includes a controller configured to, in each of a plurality of sampling iterations, control the quantum computing device to electrically couple the Majorana island to the electrical ground while a first plunger gate located proximate to the Majorana island is set to an idle voltage. The controller is further configured to control the quantum computing device to disconnect the Majorana island from the electrical ground, electrically couple the Majorana island to the QD, and, via the capacitance sensor, scan over a plurality of values of a first plunger gate voltage applied to the first plunger gate and a second plunger gate voltage applied to a second plunger gate located proximate to the QD. The controller is further configured to control the quantum computing device to output, to the controller, respective quantum capacitance measurements obtained at the plurality of values of the first plunger gate voltage and the second plunger gate voltage. The controller is further configured to receive the quantum capacitance measurements. Based at least in part on the quantum capacitance measurements, the controller is further configured to determine a measured distribution of a respective plurality of resonance regions associated with the sampling iterations. Based at least in part on the measured distribution, the controller is further configured to identify a minimum-energy resonance region of the plurality of resonance regions that corresponds to a minimum energy value of the Majorana island. The controller is further configured to output the minimum-energy resonance region identification. The above features may have the technical effect of calibrating the first plunger gate voltage, the second plunger gate voltage, and the quantum capacitance associated with those voltages. The above features may have the additional technical effect of allowing the fermion number of the Majorana island to be initialized at a fermion number corresponding to the minimum energy value.

According to this aspect, the controller may be further configured to control the quantum computing device to set the first plunger gate voltage a predetermined first plunger gate voltage during scanning over the plurality of values of the second plunger gate voltage. The above features may have the technical effect of controlling for the value of the first plunger gate voltage when determining the values of the second plunger gate voltage at which resonance occurs.

According to this aspect, the controller may be further configured to control the quantum computing device to identify the resonance regions at a plurality of different first plunger gate voltages over the plurality of sampling iterations. The above features may have the technical effect of allowing a larger sample of resonance regions other than the minimum-energy resonance region to be measured.

According to this aspect, the resonance regions identified in the sampling iterations may correspond to fermion numbers of the Majorana island. The above features may have the technical effect of allowing the computing system to calibrate fermion number measurements and to initialize the fermion number of the Majorana island at a minimum-energy fermion number.

According to this aspect, prior to a joint parity measurement performed at the Majorana island, the controller may be further configured to initialize the fermion number of the Majorana island. The above features may have the technical effect of setting the fermion number of the Majorana island to a known baseline value at which the joint parity measurement has high measurement visibility.

According to this aspect, the controller may be configured to initialize the fermion number of the Majorana island at least in part by, in each of one or more initialization iterations performed until the controller identifies a current-iteration resonance region as the minimum-energy resonance region, controlling the quantum computing device to electrically couple the Majorana island to the electrical ground. In each of the initialization iterations, the controller may be further configured to control the quantum computing device to disconnect the Majorana island from the electrical ground and scan over a plurality of current-iteration values of the first plunger gate voltage and the second plunger gate voltage to identify the current-iteration resonance region. The above features may have the technical effect of iteratively resetting the fermion number of the Majorana island until the Majorana island is measured to be in the minimum-energy resonance region.

According to this aspect, subsequently to performing the joint parity measurement, the controller is further configured to perform a quasiparticle poisoning (QPP) detection at least in part by controlling the quantum computing device to obtain an additional quantum capacitance measurement of the Majorana island. Performing the QPP detection further includes determining whether QPP has occurred at the Majorana island based at least in part on the additional quantum capacitance measurement and the minimum-energy resonance region identification. The above features may have the technical effect of using the identification of the minimum-energy resonance region obtained during calibration to determine whether a QPP event has altered the fermion number of the Majorana island.

According to this aspect, the controller may be configured to determine whether QPP has occurred at least in part by determining whether resonance occurs at the minimum-energy resonance region. The above features may have the technical effect of determining whether a QPP event has altered the fermion number of the Majorana island.

According to this aspect, the capacitance sensor may include a microwave readout circuit configured to output a microwave response signal based at least in part on a quantum capacitance of the Majorana island and the QD. The above features may have the technical effect of allowing the quantum capacitance of the Majorana island and the QD to be measured via resonance detection.

According to this aspect, the Majorana island may be a coherent link, a Majorana tetron, or a Majorana hexon. The above features may have the technical effect of providing a structure at which the MZMs are configured to form.

According to this aspect, the measured distribution may be a thermal distribution. The minimum-energy resonance region may be the resonance region of the plurality of resonance regions that has a highest frequency in the thermal distribution. The above features may have the technical effect of allowing the controller to identify the minimum-energy resonance region by fitting the measured resonance regions to a thermal distribution.

According to this aspect, the electrical ground may be electrically coupled to the Majorana island via the QD. The above feature may have the technical effect of coupling both the Majorana island and the QD to the electrical ground in a manner that uses less wiring than separate connections to the electrical ground.

According to another aspect of the present disclosure, a method for use with a computing system including a quantum computing device and a controller is provided. The quantum computing device includes a Majorana island at which a plurality of Majorana zero modes (MZMs) are instantiated. The quantum computing device further includes a quantum dot (QD) configured to be electrically connectable to the Majorana island via an MZM of the plurality of MZMs. The quantum computing device further includes an electrical ground and a capacitance sensor. The method includes, at the quantum computing device, in each of a plurality of sampling iterations, electrically coupling the Majorana island to the electrical ground while a first plunger gate located proximate to the Majorana island is set to an idle voltage. The method further includes disconnecting the Majorana island from the electrical ground and electrically coupling the Majorana island to the QD. The method further includes, via the capacitance sensor, scanning over a plurality of values of a first plunger gate voltage of a first plunger gate located proximate to the Majorana island and a second plunger gate voltage applied to a second plunger gate located proximate to the QD. The method further includes outputting, to the controller, respective quantum capacitance measurements obtained at the plurality of values of the first plunger gate voltage and the second plunger gate voltage. At the controller, the method further includes receiving the quantum capacitance measurements. Based at least in part on the quantum capacitance measurements, the method further includes determining a measured distribution of a respective plurality of resonance regions associated with the sampling iterations. Based at least in part on the measured distribution, the method further includes identifying a minimum-energy resonance region of the plurality of resonance regions that corresponds to a minimum energy value of the Majorana island. The method further includes outputting the minimum-energy resonance region identification.

According to this aspect, the method further includes, at the quantum computing device, setting a first plunger gate voltage to a predetermined first plunger gate voltage during scanning over the plurality of values of the second plunger gate voltage. The above features may have the technical effect of controlling for the value of the first plunger gate voltage when determining the values of the second plunger gate voltage at which resonance occurs.

According to this aspect, the method may further include identifying the resonance regions at a plurality of different first plunger gate voltages over the plurality of sampling iterations. The above features may have the technical effect of allowing a larger sample of resonance regions other than the minimum-energy resonance region to be measured.

According to this aspect, the resonance regions associated with the sampling iterations may correspond to fermion numbers of the Majorana island. The above features may have the technical effect of allowing the computing system to calibrate fermion number measurements and to initialize the fermion number of the Majorana island at a minimum-energy fermion number.

According to this aspect, the method may further include initializing the fermion number of the Majorana island at least in part by, in each of one or more initialization iterations performed until a current-iteration resonance region is identified as the minimum-energy resonance region, electrically coupling the Majorana island to the electrical ground. Each of the one or more initialization iterations may further include disconnecting the Majorana island from the electrical ground. Each of the one or more initialization iterations may further include scanning over a plurality of current-iteration values of the first plunger gate voltage and the second plunger gate voltage to identify the current-iteration resonance region. The method may further include performing a joint parity measurement at the Majorana island subsequently to initializing the fermion number. The above features may have the technical effect of iteratively resetting the fermion number of the Majorana island until the Majorana island is measured to be in the minimum-energy resonance region. The above features may have the further technical effect of using the Majorana island in a quantum computation after the fermion number of the Majorana island has been initialized.

According to this aspect, the method may further include, subsequently to performing the joint parity measurement, performing a quasiparticle poisoning (QPP) detection at least in part by obtaining an additional quantum capacitance measurement of the Majorana island. Performing the QPP detection may further include determining whether QPP has occurred at the Majorana island based at least in part on the additional quantum capacitance measurement and the resonance region identification. The above features may have the technical effect of using the identification of the minimum-energy resonance region obtained during calibration to determine whether a QPP event has altered the fermion number of the Majorana island.

According to this aspect, the measured distribution may be a thermal distribution. The minimum-energy resonance region may be the resonance region of the plurality of resonance regions that has a highest frequency in the thermal distribution. The above features may have the technical effect of allowing the controller to identify the minimum-energy resonance region by fitting the measured resonance regions to a thermal distribution.

According to another aspect of the present disclosure, a computing system is provided, including a quantum computing device. The quantum computing device includes a Majorana island at which a plurality of Majorana zero modes (MZMs) are instantiated. The quantum computing device further includes a quantum dot (QD) configured to be electrically connectable to the Majorana island via an MZM of the plurality of MZMs. The quantum computing device further includes an electrical ground and a capacitance sensor. The computing system further includes a controller configured to initialize the fermion number of the Majorana island. Initializing the fermion number of the Majorana island includes, in each of one or more initialization iterations performed until the controller determines that a current-iteration resonance region is a minimum-energy resonance region of the Majorana island, controlling the quantum computing device to electrically couple the Majorana island to the electrical ground while a first plunger gate located proximate to the Majorana island is set to an idle voltage. In each of the initialization iterations, the controller is further configured to control the quantum computing device to disconnect the Majorana island from the electrical ground, and, via the capacitance sensor, scan over a plurality of current-iteration values of a first plunger gate voltage applied to the first plunger gate and a second plunger gate voltage of a second plunger gate located proximate to the QD. In each of the initialization iterations, the controller is further configured to control the quantum computing device to output, to the controller, respective quantum capacitance measurements obtained at the plurality of values of the first plunger gate voltage and the second plunger gate voltage. At the controller, each of the initialization iterations further includes receiving the quantum capacitance measurements. Based at least in part on the quantum capacitance measurements, each of the initialization iterations further includes identifying a current-iteration resonance region. Each of the initialization iterations further includes determining whether the current-iteration resonance region is the minimum-energy resonance region. The above features may have the technical effect of initializing the fermion number of the Majorana island at a fermion number corresponding to a minimum energy value.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
   a quantum computing device including:
      a Majorana island at which a plurality of Majorana zero modes (MZMs) are instantiated;
      a quantum dot (QD) configured to be electrically connectable to the Majorana island via an MZM of the plurality of MZMs;
      an electrical ground; and
      a capacitance sensor; and
   a controller configured to:
      in each of a plurality of sampling iterations, control the quantum computing device to:
         electrically couple the Majorana island to the electrical ground while a first plunger gate located proximate to the Majorana island is set to an idle voltage;
         disconnect the Majorana island from the electrical ground;
         electrically couple the Majorana island to the QD;
         via the capacitance sensor, scan over a plurality of values of a first plunger gate voltage applied to the first plunger gate and a second plunger gate voltage applied to a second plunger gate located proximate to the QD; and
         output, to the controller, respective quantum capacitance measurements obtained at the plurality of values of the first plunger gate voltage and the second plunger gate voltage;
      receive the quantum capacitance measurements;
      based at least in part on the quantum capacitance measurements, determine a measured distribution of a respective plurality of resonance regions associated with the sampling iterations;
      based at least in part on the measured distribution, identify a minimum-energy resonance region of the plurality of resonance regions that corresponds to a minimum energy value of the Majorana island; and
      output the minimum-energy resonance region identification.

2. The computing system of claim 1, wherein the controller is further configured to control the quantum computing device to set the first plunger gate voltage a predetermined first plunger gate voltage during scanning over the plurality of values of the second plunger gate voltage.

3. The computing system of claim 2, wherein the controller is further configured to control the quantum computing device to identify the resonance regions at a plurality of different first plunger gate voltages over the plurality of sampling iterations.

4. The computing system of claim 1, wherein the resonance regions identified in the sampling iterations correspond to fermion numbers of the Majorana island.

5. The computing system of claim 4, wherein, prior to a joint parity measurement performed at the Majorana island, the controller is further configured to initialize the fermion number of the Majorana island.

6. The computing system of claim 5, wherein the controller is configured to initialize the fermion number of the Majorana island at least in part by, in each of one or more initialization iterations performed until the controller identifies a current-iteration resonance region as the minimum-energy resonance region, controlling the quantum computing device to:
   electrically couple the Majorana island to the electrical ground;
   disconnect the Majorana island from the electrical ground; and
   scan over a plurality of current-iteration values of the first plunger gate voltage and the second plunger gate voltage to identify the current-iteration resonance region.

7. The computing system of claim 5, wherein, subsequently to performing the joint parity measurement, the controller is further configured to perform a quasiparticle poisoning (QPP) detection at least in part by:
   controlling the quantum computing device to obtain an additional quantum capacitance measurement of the Majorana island; and
   determining whether QPP has occurred at the Majorana island based at least in part on the additional quantum capacitance measurement and the minimum-energy resonance region identification.

8. The computing system of claim 7, wherein the controller is configured to determine whether QPP has occurred at least in part by determining whether resonance occurs at the minimum-energy resonance region.

9. The computing system of claim 1, wherein the capacitance sensor includes a microwave readout circuit configured to output a microwave response signal based at least in part on a quantum capacitance of the Majorana island and the QD.

10. The computing system of claim 1, wherein the Majorana island is a coherent link, a Majorana tetron, or a Majorana hexon.

11. The computing system of claim 1, wherein:
   the measured distribution is a thermal distribution; and
   the minimum-energy resonance region is the resonance region of the plurality of resonance regions that has a highest frequency in the thermal distribution.

12. The computing system of claim 1, wherein the electrical ground is electrically coupled to the Majorana island via the QD.

13. A method for use with a computing system including a quantum computing device and a controller, wherein:
   the quantum computing device includes:
      a Majorana island at which a plurality of Majorana zero modes (MZMs) are instantiated;
      a quantum dot (QD) configured to be electrically connectable to the Majorana island via an MZM of the plurality of MZMs;
      an electrical ground; and
      a capacitance sensor; and
   the method comprises:
      at the quantum computing device, in each of a plurality of sampling iterations:
         electrically coupling the Majorana island to the electrical ground while a first plunger gate located proximate to the Majorana island is set to an idle voltage;
         disconnecting the Majorana island from the electrical ground;
         electrically coupling the Majorana island to the QD;
         via the capacitance sensor, scanning over a plurality of values of a first plunger gate voltage of a first plunger gate located proximate to the Majorana island and a second plunger gate voltage applied to a second plunger gate located proximate to the QD; and outputting, to the controller, respective quantum capacitance measurements obtained at the plurality of values of the first plunger gate voltage and the second plunger gate voltage; and at the controller:
receiving the quantum capacitance measurements;
based at least in part on the quantum capacitance measurements, determining a measured distribution of a respective plurality of resonance regions associated with the sampling iterations;
based at least in part on the measured distribution, identifying a minimum-energy resonance region of the plurality of resonance regions that corresponds to a minimum energy value of the Majorana island; and
outputting the minimum-energy resonance region identification.

14. The method of claim 13, further comprising, at the quantum computing device, setting a first plunger gate voltage to a predetermined first plunger gate voltage during scanning over the plurality of values of the second plunger gate voltage.

15. The method of claim 14, further comprising identifying the resonance regions at a plurality of different first plunger gate voltages over the plurality of sampling iterations.

16. The method of claim 13, wherein the resonance regions associated with the sampling iterations correspond to fermion numbers of the Majorana island.

17. The method of claim 16, further comprising:
initializing the fermion number of the Majorana island at least in part by, in each of one or more initialization iterations performed until a current-iteration resonance region is identified as the minimum-energy resonance region:
electrically coupling the Majorana island to the electrical ground;
disconnecting the Majorana island from the electrical ground; and
scanning over a plurality of current-iteration values of the first plunger gate voltage and the second plunger gate voltage to identify the current-iteration resonance region; and
performing a joint parity measurement at the Majorana island subsequently to initializing the fermion number.

18. The method of claim 17, further comprising, subsequently to performing the joint parity measurement, performing a quasiparticle poisoning (QPP) detection at least in part by:

obtaining an additional quantum capacitance measurement of the Majorana island; and
determining whether QPP has occurred at the Majorana island based at least in part on the additional quantum capacitance measurement and the resonance region identification.

19. The method of claim 13, wherein:
the measured distribution is a thermal distribution; and
the minimum-energy resonance region is the resonance region of the plurality of resonance regions that has a highest frequency in the thermal distribution.

20. A computing system comprising:
a quantum computing device including:
a Majorana island at which a plurality of Majorana zero modes (MZMs) are instantiated;
a quantum dot (QD) configured to be electrically connectable to the Majorana island via an MZM of the plurality of MZMs;
an electrical ground; and
a capacitance sensor; and
a controller configured to initialize a fermion number of the Majorana island at least in part by, in each of one or more initialization iterations performed until the controller determines that a current-iteration resonance region is a minimum-energy resonance region of the Majorana island:
controlling the quantum computing device to:
electrically couple the Majorana island to the electrical ground while a first plunger gate located proximate to the Majorana island is set to an idle voltage;
disconnect the Majorana island from the electrical ground; and
via the capacitance sensor, scan over a plurality of current-iteration values of a first plunger gate voltage applied to the first plunger gate and a second plunger gate voltage of a second plunger gate located proximate to the QD; and
output, to the controller, respective quantum capacitance measurements obtained at the plurality of values of the first plunger gate voltage and the second plunger gate voltage;
receiving the quantum capacitance measurements;
based at least in part on the quantum capacitance measurements, identifying a current-iteration resonance region; and
determining whether the current-iteration resonance region is the minimum-energy resonance region.

* * * * *